United States Patent Office 3,423,838
Patented Jan. 28, 1969

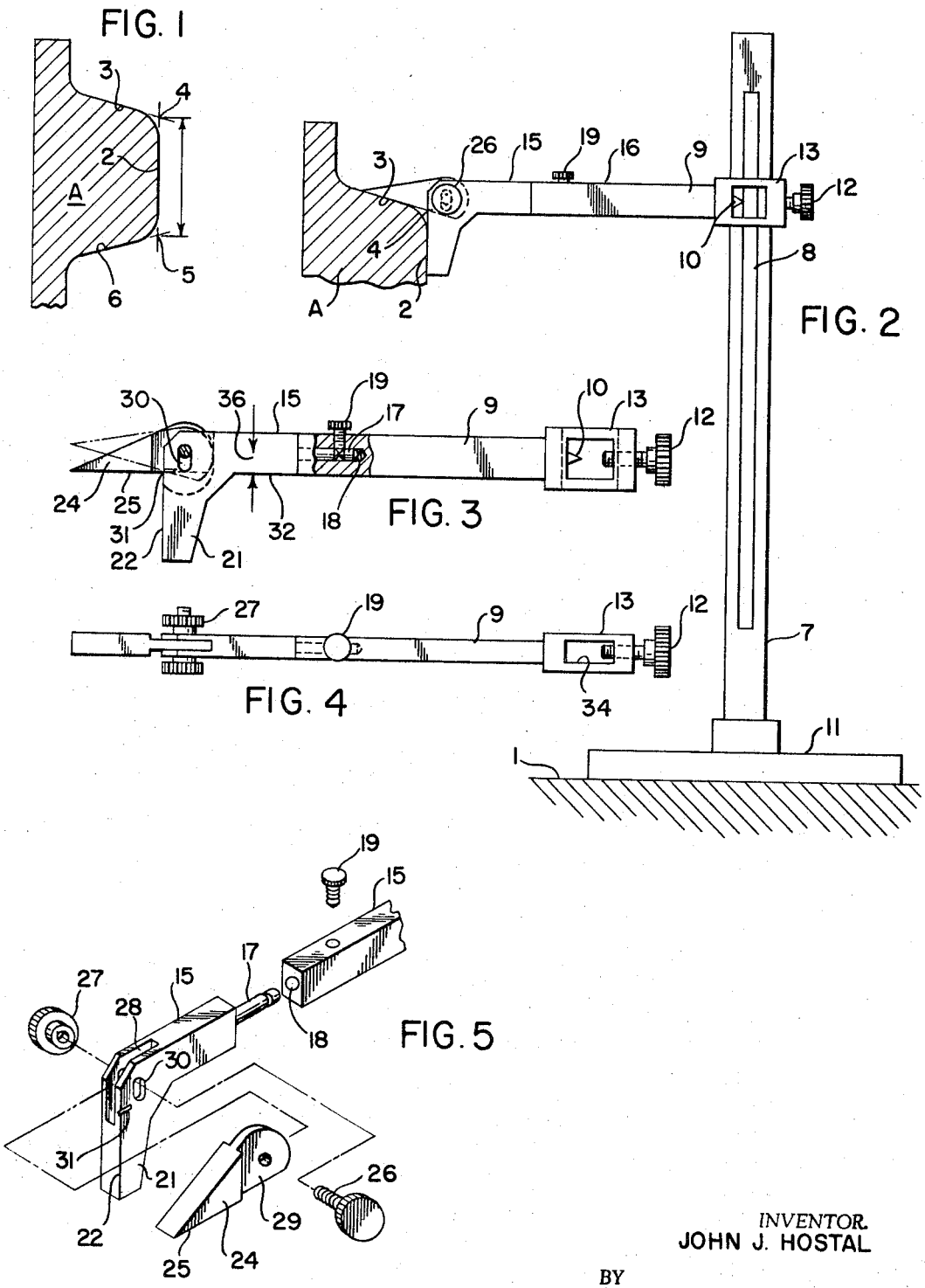

3,423,838
APPARATUS FOR MEASURING DISTANCES BETWEEN THEORETICAL POINTS OF INTERSECTION OF SURFACES
John J. Hostal, 21974 Cottonwood Drive,
Rocky River, Ohio 44116
Filed Aug. 24, 1967, Ser. No. 663,022
U.S. Cl. 33—169
Int. Cl. G01b 3/20
5 Claims

ABSTRACT OF THE DISCLOSURE

A device for use in the inspection of castings and the like by measuring distances between theoretical points of intersection of pairs of angularly disposed planer surfaces. The device has a slider movable along a scale which is fixed to a support that is movable laterally on a bedplate and which is adapted to define positions of a given point on said slider relative to said scale. The slider has a pair of jaws which are pivotable about an axis perpendicular to said scale. One of said jaws has a surface always parallel to said scale and the other jaw is moveable both angularly and parallel with respect to said surface, and means for locking said jaws in position when bearing flatly against portions of angularly disposed planar surfaces with the intersection of planar surfaces of said jaws at a definite point on said slider.

---

This invention relates to the method and apparatus for measuring location of and distance between the theoretical points of intersection of the planes of planar portions of the surfaces of articles, such as castings and the like and particularly those articles having chamfered or rounded corners or areas between planar portions of surfaces.

Castings such as those of light metals, including aluminum and ferrous metals, shrink or change dimensions on cooling. They are usually prepared with rounded or chamfered areas between planar surfaces. The theoretical points of the intersection of the planes of such surfaces are usually designated in the drawings and dimensions are based on such theoretical points. The distances between such points are often the critical dimensions of the castings. In checking or inspecting the various castings, the distance between these theoretical points of intersection must be measured in a routine manner. In the past this has been largely a matter of guesswork as no instrument has been available to locate the theoretical points of intersection accurately.

It is an object of the present invention to provide apparatus which is suitable for inspection of castings in production, which will accurately measure the distance between the theoretical points of intersection of planar portions of the surfaces of castings and other articles, and which will facilitate inspection and will show variance in such articles.

Another object of the present invention is to provide a method for determining distances between theoretical points of intersection of the planes of surface portions which do not actually intersect.

Other objects will be apparent from the following description of the invention, as illustrated by the appended drawing, in which:

FIGURE 1 is an elevational sectional view of a portion of a casting showing theoretical points of intersection, the distance between which is measured according to the method of the present invention by the apparatus of the present invention;

FIG. 2 is an elevational view of apparatus of the present invention showing a portion of the casting of FIG. 1 and the manner in which said apparatus is utilized;

FIG. 3 is an elevational view of the slider portion of the apparatus of the present invention with some portions removed to show the details thereof in section;

FIG. 4 is a plan view of the portion of the apparatus of FIG. 3; and

FIG. 5 is an exploded view of a novel portion of the slider portion of the apparatus of the present invention showing the manner of assembly of the components thereof.

Referring more particularly to the drawing, in which like parts are designated by like numerals of reference throughout the several views, an article such as a casting A to be measured is mounted upon a suitable base, preferably on or adjacent the base 1 so that the surface 2 is in a vertical position. The base 1 has an upper surface machined to provide a flat surface. The distance between the point of intersection 4 of the surfaces 2 and 3, and the point of intersection 5 of the surfaces 2 and 6 of the casting or article is to be accurately measured.

The apparatus of the present invention comprises the support 7, which is preferably rectangular in cross section and which carries a suitable scale 8. A slider or arm 9, preferably having an indicator 10 thereon, usually a vernier scale, is fixedly or slidably carried by said support 7 by suitable means, such as by the cage 13 having the cavity 34, which is adapted to receive the support 7 therein, and the thumb screw 12 threaded in a wall thereof. The position of the indicator 10 can be read on the scale 8. The support 7 is conveniently carried on a suitable base portion 11 so that the sliding surfaces thereof are parallel to the plane of the surface 2 of the casting to be measured and perpendicular to the upper flat surface of the base 1. The base portion 11 is preferably slidably carried on the machine surface 1 so that the support 7 may be moved in any position and still have its sliding surface parallel to the surface 2. When the thumb screw 12 is loosened so that the end thereof is free of the support 7, the cage 13 surrounding the support 7 and the slider 9 is movable to any desired position with respect to the scale 8.

The horizontal slider 9 comprises a measuring section 15 and a carrying section 16. Section 15 is pivotally carried by the section 16 by suitable means, such as the pivot pin 17, which is integral with or rigidly attached to section 15 and which is pivotally received in the bore 18 of the section 16, which is rigidly attached to the cage 13. The axis of the bore 18 extends parallel to section 16 of the arm or slider 9 and extends at right angles to the locating surface of support 7 on which the cage 13 slides.

Fastening means, such as the screw 19 is threaded into the section 16 for holding the section 15 in any desired angular position with respect to the section 16 and the slide surface of support 7. Section 15 carries in a fixed position relative thereto an angularly extending portion or jaw 21 having the surface 22 at right angles to the axis of the pivot means, such as the pin 17 and parallel to the sliding surface of the support 7, so that the surface 22 is perpendicular to the machine surface of the base 1.

The movable jaw, having a suitable flat surface 25, is suitably movably carried by the section 15 of the slider 9. Means such as the pivot pin 26 carried by the section 15 is provided so that the jaw 24 may be moved angularly with respect to the section 15. Means is also provided for moving the pivot point vertically parallel to the surface 22. The jaw 24 is angularly movable about the pivot pin 26, which is threaded into the nut 27 and when tightened serves as means for holding the jaw 24 in a fixed position, if desired.

The section 15 is preferably bifurcated to provide the slotted or female portion 28, which is adapted to carry and receive the male portion 29 of the jaw 24 having reduced thickness. Suitable means such as the slot 30 is provided in the section 15 to permit the pivot pin 26 to be moved parallel with respect to the surface 22 of the portion 21.

A locating point 31 or mark is provided on the section 15 so that the intersection of the surfaces 22 and 25 may be maintained at the same point, regardless of the angle of the surface 25 with respect to the surface 22. The locating point 31 is in a definite position with respect to the pivot 17 and the indicator point 10 and, as shown, is in the plane of the lower surface 32 of the section 15 of the slider 9.

In the operation of the device for measuring surfaces, the casting A is mounted as aforesaid so that the surface 2 is parallel with the surface 22 of the portion 21 and with the axis of the mounting member or support 7, which fits in the cavity 34 of the cage 13 of the slider 9. The nut 27 is loosened so that the jaw 24 may be pivoted about the pin 26 and the surface 25 is placed firmly against the surface 3. The height of the slider 9 and the cage 13 is adjusted by loosening the thumb screw 12 until the intersection of the surface 25 and the surface 22 occurs at the fixed base point 31. The reading is then made on the scale 8 and recorded. The locking means 19 is then loosened; the section 15 is turned on the pivot 19 so that the portion 21 extends upwardly from the axis of the pivot instead of downwardly, as shown. The slider is lowered, the surface 22 is again placed against the surface 2 of the casting, but the surface 25 of the jaw 24 is placed against the surface 6 of the casting.

The height of the cage 13 and the slider 9 is adjusted accurately so that the inner section of the surface 25 of the jaw 24 with the surface 22 again occurs at the same locating point 31. The reading of the indicator 10 on the scale 8 is again recorded. The difference between the two readings on the scale, plus twice the distance 36 between the locating point 31 and the axis of the pivot pin 17, is the distance between the points of intersection 4 and 5 of the casting.

In the apparatus shown in the drawing, the axis of the pivot pin 17 corresponds with the center line of the sections 15 and 16 of the slider 9, so that twice the distance 36 corresponds to the width of the slider 9, which may be conveniently made as a centimeter or one-half inch to facilitate measurements. The distance 36 may be made any convenient distance, even "0" by changes of the length in the slot 30 and appropriate location of the index or locating point 31.

It is also apparent that in accordance with the provisions of the patent statutes modifications of the invention may be made without changing the spirit thereof.

Having described my invention, I claim:

1. A device suitable for measuring the distance between the theoretical points of intersection of three planes embodying planar surfaces of castings and the like, which comprises an elongated support, a scale connected with said support, a slider slidably carried by said support and extending laterally therefrom, means for reading on said scale the position of a point on said slider with respect to said scale, said slider comprising a measuring section with both a fixed jaw and an angularly movable jaw and a carrying section which is slidably carried on said support and which carries said measuring section, means for pivotally carrying said measuring section on said carrying section about a pivot axis perpendicular to the sliding surface of said support, said fixed jaw of said measuring section having a plane surface perpendicular to the axis of said pivot between said sections, said movable jaw having a plane surface that intersects with said plane surface of said fixed jaw, means for moving the axis of the pivot point of said movable jaw relative to and parallel to the planar surface of said fixed jaw.

2. The device according to claim 1 which also has means for holding the said movable jaw in a fixed position relative to said stationary jaw.

3. The device according to claim 2 having means for temporarily fixing said slider in nonslidable relation to said support.

4. The device according to claim 2 which also has an index point for positioning the point of intersection of the planar surfaces of said jaws.

5. A method for measuring the distances between points of intersection of intersecting planes defined by three nonintersecting and nonparallel adjacent planar surface portions of a casting, which comprises arranging one of said planar surfaces in a vertical position, placing against said surface a flat, permanently vertical surface fixedly carried by an arm movably only vertically relative to a linear scale indicating distance of an index point on said arm from a base, placing a flat surface of a movable member pivotally carried by said arm against another of said surfaces noting the point of intersection of said flat surfaces and the vertical distance thereof from said index point and reading the distance of said indicator from a base point, turning said arm 180° about an axis perpendicular to said scale again applying said permanently vertical surface against a portion of the same planar surface as before, placing the flat surface of said movable member against the third of said planar surface portions of said casting, shifting the pivotal axis of said movable member vertically so that the intersection of said flat surface of said movable and said permanently vertical surfaces is at the same point on said arm, again reading the position of said index point relative to said base, calculating differences between scale readings and adding thereto two times the vertical distance between said index point and said point of intersection of said permanently vertical flat surface and the flat surface of said movable member.

References Cited

UNITED STATES PATENTS

| 1,459,500 | 6/1923 | Cady. |
| 3,100,346 | 8/1963 | Cannon. |

FOREIGN PATENTS

| 254,564 | 12/1912 | Germany. |

SAMUEL S. MATTHEWS, *Primary Examiner.*